US009093004B2

(12) United States Patent
Pearson et al.

(10) Patent No.: US 9,093,004 B2
(45) Date of Patent: Jul. 28, 2015

(54) SEAT MARKER ASSEMBLY

(71) Applicants: Dennis Pearson, Foothill Ranch, CA (US); Guang Jin, Santa Monica, CA (US)

(72) Inventors: Dennis Pearson, Foothill Ranch, CA (US); Guang Jin, Santa Monica, CA (US)

(73) Assignee: Tempo Industries, LLC, Irvine, CA (US)

(*) Notice: Subject to any disclaimer, the term of this patent is extended or adjusted under 35 U.S.C. 154(b) by 182 days.

(21) Appl. No.: 14/044,695

(22) Filed: Oct. 2, 2013

(65) Prior Publication Data

US 2015/0089850 A1 Apr. 2, 2015

(51) Int. Cl.

| | |
|---|---|
| ***G06F 3/02*** | (2006.01) |
| ***G09F 13/22*** | (2006.01) |
| ***G09F 3/02*** | (2006.01) |
| ***F21V 19/00*** | (2006.01) |
| ***E04H 3/30*** | (2006.01) |
| *G09F 23/00* | (2006.01) |

(52) U.S. Cl.

CPC .................. *G09F 13/22* (2013.01); *E04H 3/30* (2013.01); *F21V 19/003* (2013.01); *F21V 19/0055* (2013.01); *G09F 3/02* (2013.01); *G09F 2013/222* (2013.01); *G09F 2023/005* (2013.01)

(58) Field of Classification Search

CPC ..... G09F 13/22; G09F 3/02; G09F 2023/005; G09F 2013/222; F21V 19/003; F21V 19/0055; F21V 15/012; F21V 17/02; F21V 17/104; F21V 33/0016; F21V 11/10; F21V 11/12; F21V 11/14; F21W 2121/004; F21W 2131/10; F21W 2131/40; F21W 2111/06; F21W 2111/08; F21S 4/003; F21S 4/008; F21S 8/022; B64D 2001/0053; H02G 3/0406

USPC ......... 362/249.02; 174/481, 68.1, 68.3, 72 R, 174/72 A, 88 R, 95, 70 C

See application file for complete search history.

(56) References Cited

U.S. PATENT DOCUMENTS

| | | | | |
|---|---|---|---|---|
| 5,337,225 | A * | 8/1994 | Brookman | 362/145 |
| 5,627,340 | A * | 5/1997 | Smith et al. | 174/482 |
| 6,183,104 | B1 * | 2/2001 | Ferrara | 362/145 |
| 7,726,840 | B2 | 6/2010 | Pearson et al. | |
| 8,002,426 | B2 | 8/2011 | Pearson et al. | |
| 8,061,870 | B2 | 11/2011 | Pearson et al. | |
| 8,398,276 | B2 | 3/2013 | Pearson et al. | |
| 2012/0051041 | A1 | 3/2012 | Edmond et al. | |
| 2013/0021792 | A1 | 1/2013 | Snell et al. | |
| 2013/0070461 | A1 | 3/2013 | Pickard | |
| 2013/0208469 | A1 | 5/2013 | Progl | |
| 2013/0176722 | A1 | 7/2013 | Lay et al. | |
| 2013/0208457 | A1 | 8/2013 | Durkee et al. | |

(Continued)

*Primary Examiner* — Mary McManmon
*Assistant Examiner* — Omar Rojas Cadima
(74) *Attorney, Agent, or Firm* — Greenberg Traurig LLP; Franklin D. Ubell

(57) ABSTRACT

A seat marker assembly including a raceway for receiving and mounting a central base component which includes a seat marker and an LED carrying circuit board positioned to illuminate the seat marker, the raceway further mounting first and second wire way covers on either side of the central base component, the assembly further including an end wire way assembly including a wire way base, an end wire way slide with an integrally formed wire guide, and an end wire way cover, wherein the end wire way slide is configured to slidably mount into the wire way base and the end wire way cover is configured to engage the wire way slide so as to position the wire guide at a selected distance beyond the wire way base.

5 Claims, 14 Drawing Sheets

(56) References Cited

U.S. PATENT DOCUMENTS

| | | | |
|---|---|---|---|
| 2013/0250567 | A1 | 9/2013 | Edmond et al. |
| 2013/0271979 | A1 | 10/2013 | Pearson et al. |
| 2013/0272000 | A1 | 10/2013 | Pearson et al. |
| 2013/0279165 | A1 | 10/2013 | Pearson et al. |
| 2013/0279179 | A1 | 10/2013 | Pearson et al. |
| 2013/0279180 | A1 | 10/2013 | Pearson et al. |

* cited by examiner

SEAT MARKER ASSEMBLY

BACKGROUND

1. Field

The subject disclosure relates to electric lighting fixtures and more particularly to an illuminated seat marker for identifying seat locations in theatres and similar venues.

2. Related Art

In the past, aisle light has been used in theatres and other venues for assisting patrons in ascending and descending aisles, stairways, and the like.

SUMMARY

A seat marker assembly according to an illustrative embodiment comprises a central base component which receives and mounts a seat marker component and an LED carrying circuit board disposed to illuminate the seat marker. A raceway attachable to a mounting surface such as a step is provided for receiving and mounting the central base component. First and second wire way covers are shaped and dimensioned to respectively cover first and second open areas of the raceway on either side of the central base component.

In one embodiment, an end wire way base assembly is provided for transitioning a wire harness or other electrical conductors from the central base to an edge of a step or other mounting surface. The end wire way base assembly may comprise an end wire way base component, an end wire way slide component having a wire guide formed at an end thereof, and an end wire way cover component. In an embodiment of one such assembly, the wire way base component and wire way slide component are so configured that the wire way slide slidably mounts into the wire way base. The wire way slide cover is in turn configured to engage the end wire way slide so as to position it so that the wire guide is a selected distance away from a front surface of the wire way base, so as to facilitate electrical connections. In one embodiment, the assembly further includes an electrical plug component configured to supply electrical power to the LED carrying circuit board wherein a plurality of surfaces of the central base component position and retain both the electrical plug component and a wire harness supplying electrical power thereto.

DETAILED DESCRIPTION

Figure 1:
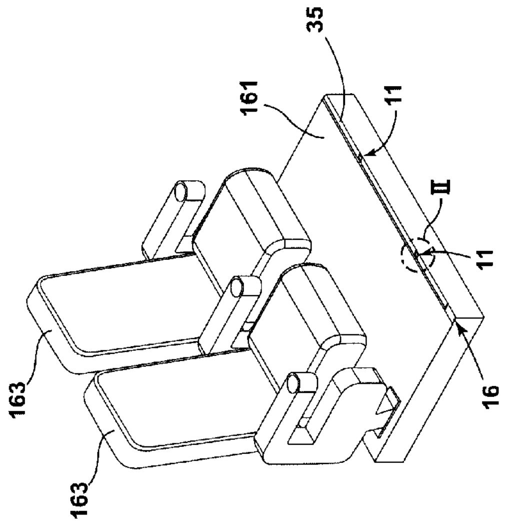
FIG. 1 is a perspective view of illustrative theatre seating arrangement employing seat marker assemblies according to an illustrative embodiment.
Figure 2:
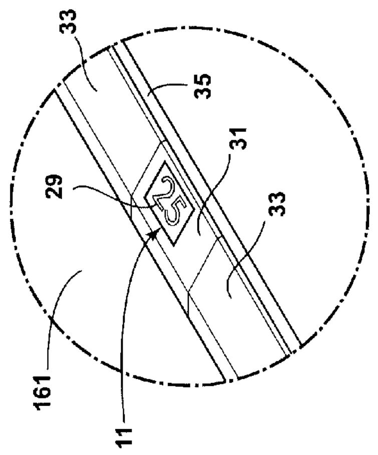
FIG. 2 is an enlarged view of region II of FIG. 1.
Figure 3:
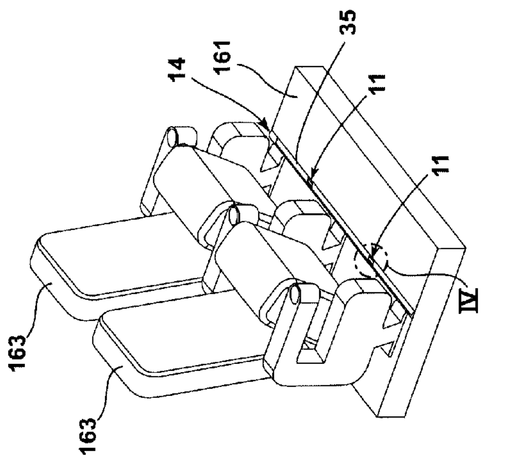
FIG. 3 is a perspective view of a second illustrative theatre seating arrangement employing seat marker assemblies according to an illustrative embodiment.
Figure 4:
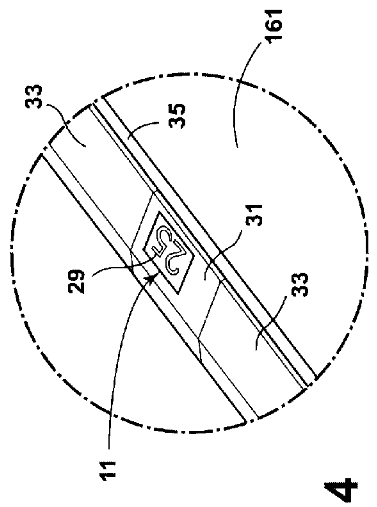
FIG. 4 is an enlarged view of region IV of FIG. 1.

FIGS. 1-4 illustrate seat markers 11 according to an illustrative embodiment installed in two different manners. FIGS. 1 and 2 show seat markers 11 located on a ledge or step 161 in front of a pair of seats 163, while FIGS. 3 and 4 show seat markers 11 placed underneath the seats where they can be observed when the seats are in an “up” position. The seat marker installation of FIGS. 1-4 includes a raceway or mounting extrusion 35 into which is mounted a seat marker cover 31 and respective first and second wire way covers 33. The seat marker component 29 having an alphanumeric designation is located in an opening in the cover 31. The first and second installations further include respective end wire way assemblies 16, 14, described in more detail below.

Figure 5:
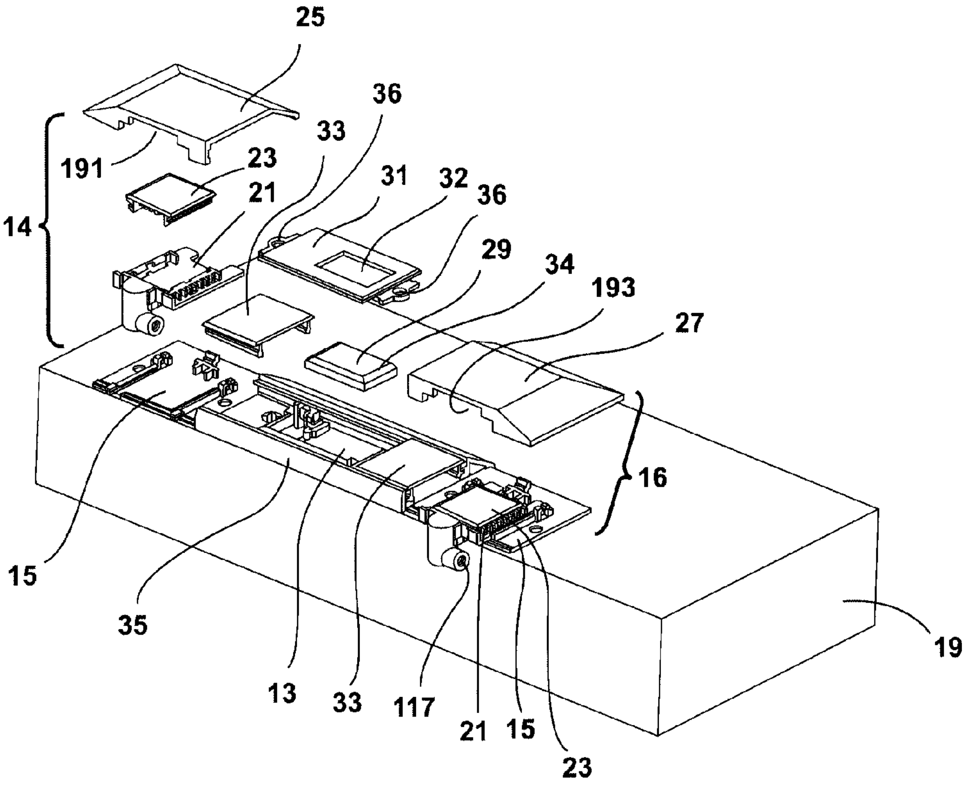
FIG. 5 is an exploded perspective view of illustrative seat marker assembly componentry.

An exploded view of illustrative componentry of the seat marker system illustrated in FIGS. 1-4 is presented in FIG. 5. The componentry of FIG. 5 includes a central base 13 and first and second end wire way assemblies 14, 16. In typical illustrative embodiments, only one of the first and second end wire way assemblies is employed. As will be discussed further, the end wire way assemblies 14, 16 provide an entry point for a power supply conduit, as well as an installation adjustment feature.

In an illustrative embodiment, each of the first and second wire way assemblies 14, 16 includes two identical components: an end wire way base 15, an end wire way slide 21, and respective end wire way covers 25, 27. Each end wire way slide 21 slidably mounts into the wire way base 15. An end wire way cover 25 fits over the first end wire way assembly 14, while a second end wire way cover 27 fits over the second wire way assembly 16. In the embodiment of FIG. 5, the wire way base 15 and wire way slide 21 of the second wire way assembly 16 are shown assembled together.

Further with respect to the componentry of FIG. 5, the seat marker component 29 fits into the central base component 13, as does the seat marker cover 31. The third and fourth wire way covers 33 fit into the extrusion 35, as does the central base 13. The seat marker cover 31 includes a rectangular opening 32, which fits closely around an upper rectangular portion 34 of the seat marker 29. The cover 31 includes first and second mounting tabs 36, which, in the illustrative embodiment, are positioned such that fastening devices may be inserted therethrough and into concentrically located holes 67 of the central base 13 (FIG. 6).

Figure 6:
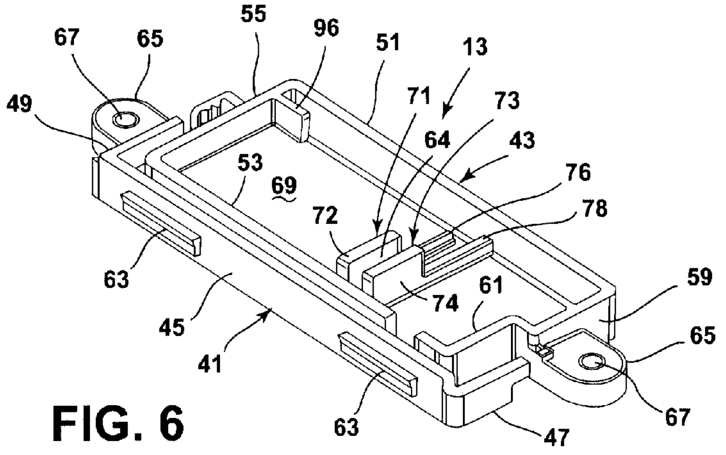
FIG. 6 is a perspective view of a central base component of an illustrative seat marker assembly.
Figure 7:
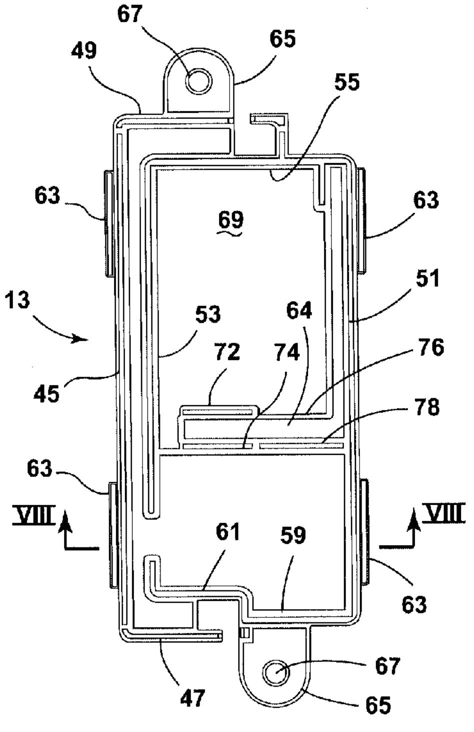
FIG. 7 is a top view of the base component of FIG. 6.
Figure 8:
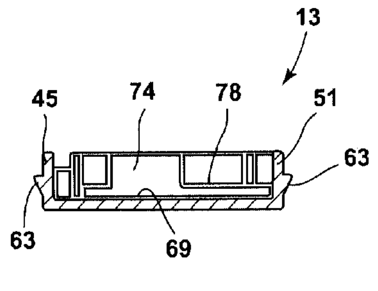
FIG. 8 is a sectional view taken at 8-8 of FIG. 7.

An illustrative central base component embodiment 13 is illustrated in further detail in FIGS. 6-8. In one embodiment, the central base 13 may be a single piece die cast component, formed, for example, of a zinc alloy such as ZAMAK 3. The base 13 includes first and second vertical wall segments 41 and 43. The first vertical wall segment 41 has a side wall portion 45 and two end walls 47, 49 formed perpendicular to the side wall 45. The second vertical wall 43 has an outer side wall 51 and an inner side wall 53, each of which lies parallel to the side wall 45 of the first vertical wall segment 41. The outer side wall 51 and the inner side wall 53 are joined at an upper end by an end wall 55, which lies perpendicular to the side walls 51, 53. At a lower end, the outer side wall 51 forms into a perpendicularly disposed end wall 59, which then forms into an inset second end wall 61. The end wall 61 lies generally within and parallel to the lower end wall 47 of the side wall segment 41. At an upper end, an end tab 96 lies parallel to and spaced apart from the side wall 51. Each of the parallel outer side walls 45, 51 has a pair of tabs 63 formed thereon, and the end walls 59, 49 have respective mounting tabs 65 formed thereon, with suitable threaded holes 67 formed therein for receiving fastening devices, such as, for example, screws.

In the illustrative embodiment, the interior floor 69 of the base component 13 has two vertical projecting surfaces 71, 73, formed thereon, which are similarly shaped and which have respective rectangular portions 72, 74 of a height equal to that of the sides 45, 43 and respective recessed portions 76, 78 of a lesser height. As will be described below, the space 64 between the projecting surfaces 71, 73 is dimensioned to receive an electrical connector plug and the recessed portions 72, 74 permit grasping the connector plug to insert or remove it. In addition, various walls, e.g., 47, 61; 45, 53 provide guide ways for electrical conductors or a wiring harness.

Figure 9:
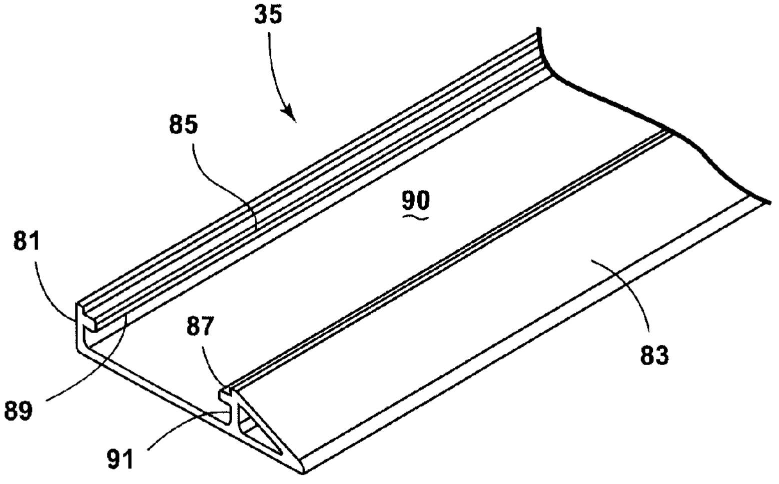
FIG. 9 is a perspective view of a raceway component of the illustrative seat marker assembly.
Figure 10:
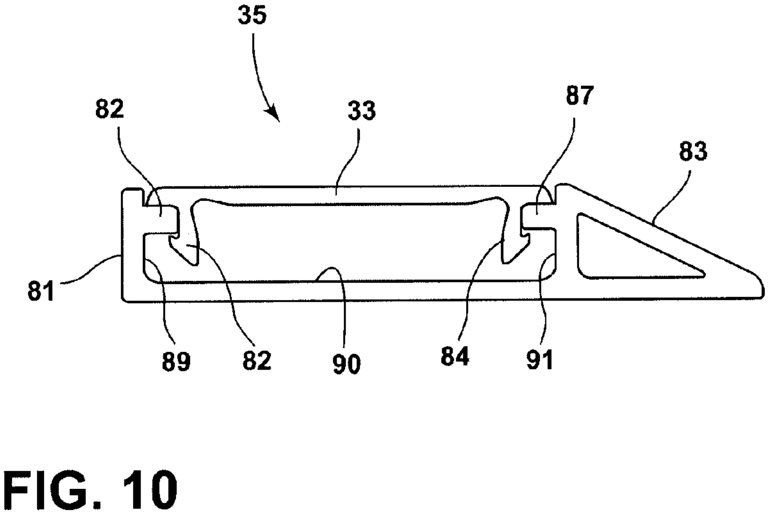
FIG. 10 is an end view of the raceway component of FIG. 9.

An illustrative embodiment of the raceway component or mounting extrusion 35 is shown in further detail in FIGS. 9 and 10. As shown, the raceway 35 has a vertical back surface 81 and a flat rectangular front 83, which may be angled at an angle to the horizontal, of, for example, 27 degrees. Horizontal ribs 85, 87 protrude from opposite vertical interior surfaces 89, 91 of the raceway 35 and are located above the floor 90 at a distance sufficient to allow the tabs 63 of the central base 13 to slide under the ribs 85, 87 such that the base 13 can be slid into and retained in position by the raceway 35. In one embodiment, the raceway 35 is attached to a mounting surface or floor, for example, by gluing. FIG. 10 further illustrates the positioning of one of the wire way covers 33 in the raceway 35 and retention thereof by means of flexible tabs 82, 84 which engage the ribs 85, 87. In one embodiment, the raceway 35 may be a single piece extruded component, formed, for example, of rigid black PVC.

Figure 11:
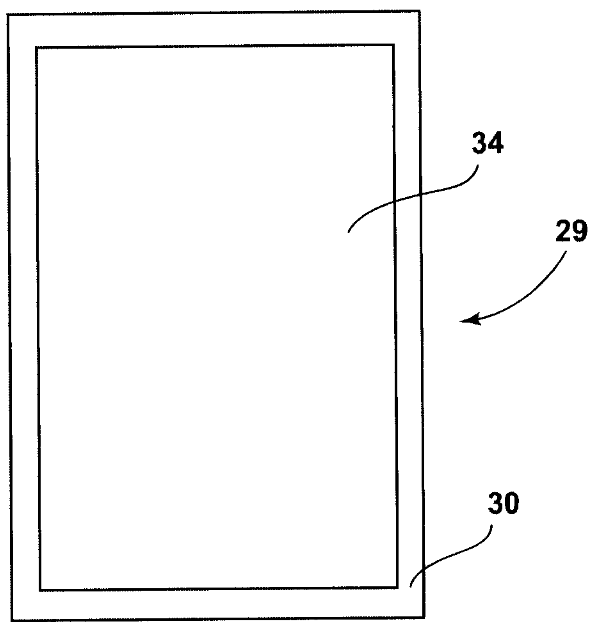
FIG. 11 is a top view of a marker component of the illustrative seat marker assembly.
Figure 12:
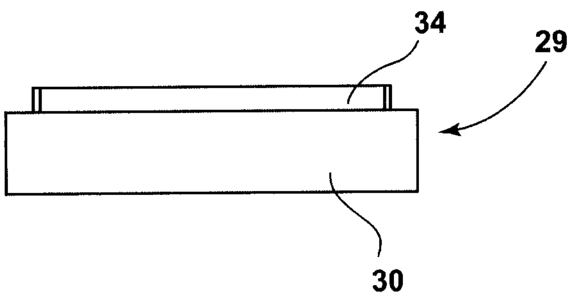
FIG. 12 is an end view of the marker component of FIG. 11.

The seat marker 29 is illustrated in more detail in FIGS. 11 and 12. The seat marker 29 may be formed of a plastic such as acrylic, may be clear in color and may have suitable markings such as alpha numeric characters formed thereon, as shown in FIGS. 2 and 4. In one embodiment, such characters may be formed by etching. The marker 29 has a rectangular base 30 and a smaller centrally located upper rectangular portion 34. In an illustrative embodiment, the base 30 of the marker 29 is dimensioned to fit snugly within the walls 53, end tab 96 and projecting surface 71 of the central base component 13.

Figure 13:
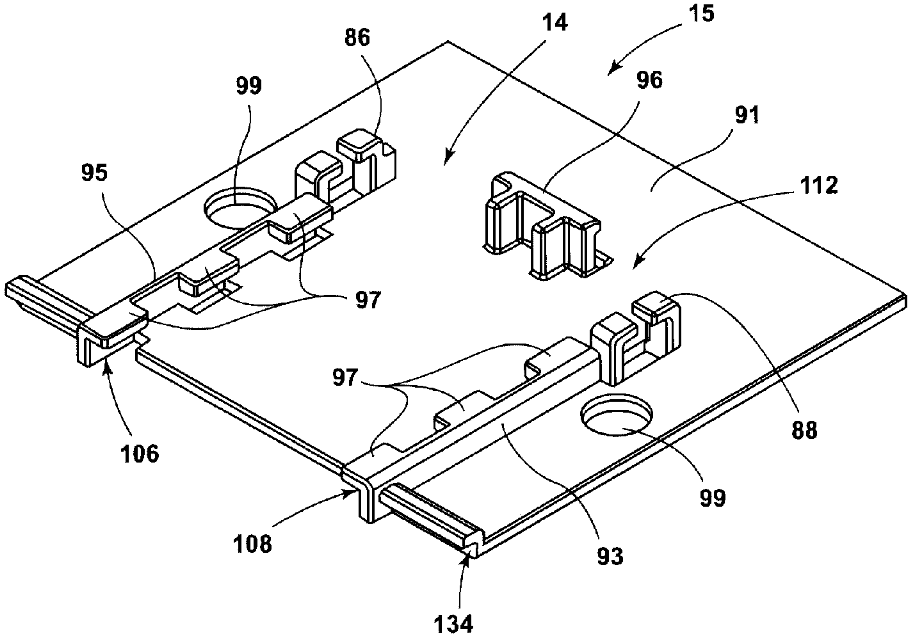
FIG. 13 is a perspective view of an end wire way base component of the illustrative seat marker assembly.

The wire way base component 15, which, in one embodiment, may be a single piece molded ZAMAK 3 component, is shown in more detail in FIG. 13. The base component 15 has a generally rectangular floor 91, first and second parallel vertical walls 93, 95 and a rear vertical wall 96, each of which extend above the base 81. Respective sets of horizontal tabs 97 extend inwardly from the top edge of each of the parallel vertical walls 93, 95. Vertical wire guides 86, 88 also extend upwardly from the floor 81 and provide wire control as described in further detail below. A pair of mounting holes 99 is provided to facilitate attachment of the base 15 to a mounting surface or floor.

Figure 14:
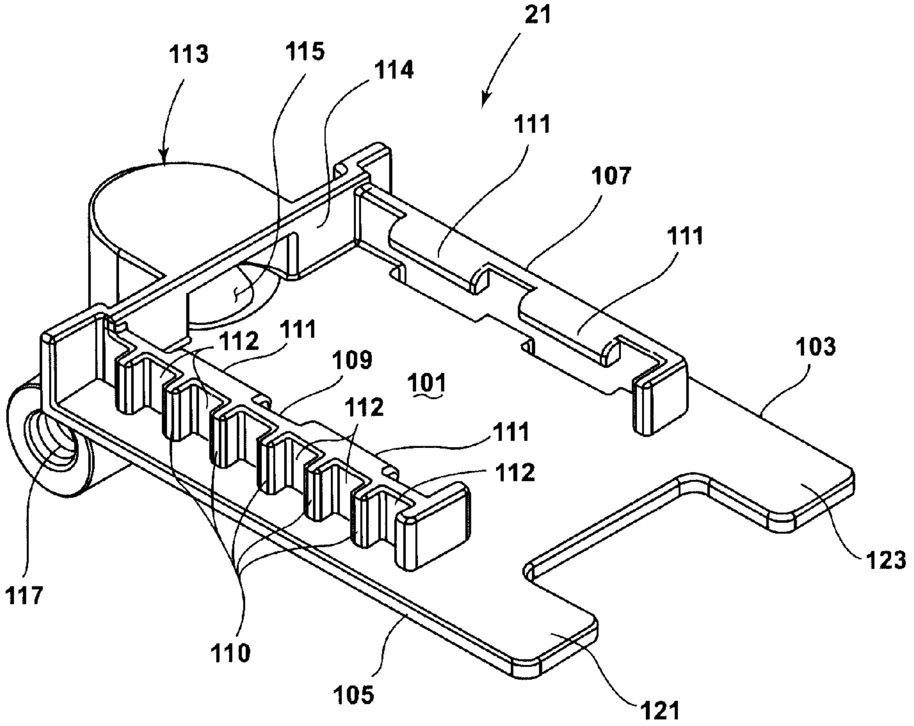
FIG. 14 is a perspective view of an end wire way slide component of the illustrative seat marker assembly.
Figure 15:
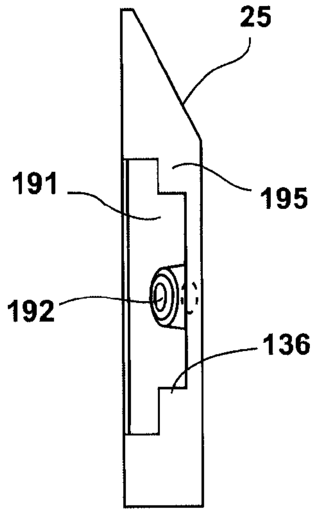
FIG. 15 is a side view of a first end cover of the illustrative seat marker assembly.
Figure 16:
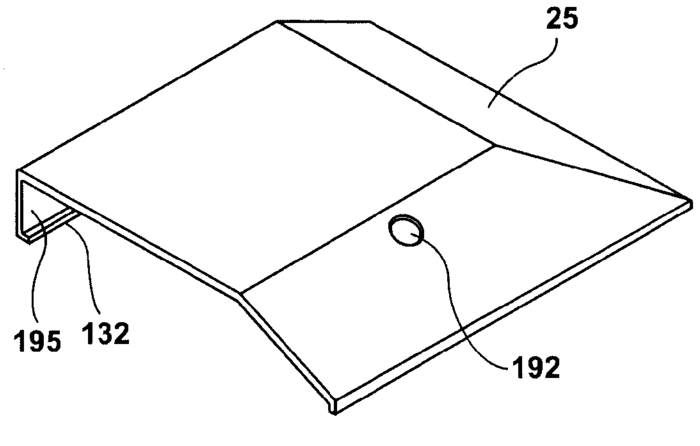
FIG. 16 is a perspective view of the end cover of FIG. 15.
Figure 17:
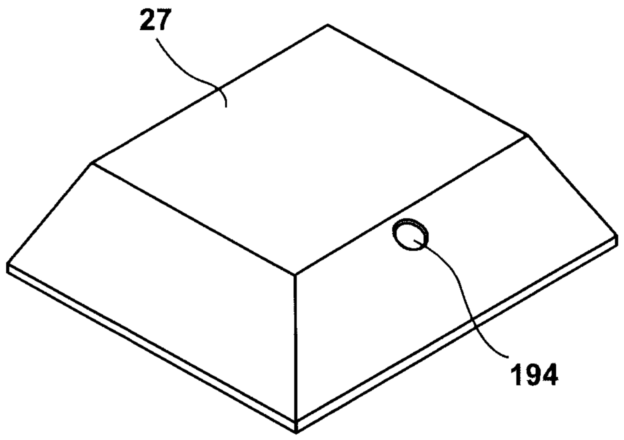
FIG. 17 is a perspective view of a second end cover of the illustrative seat marker assembly.
Figure 18:
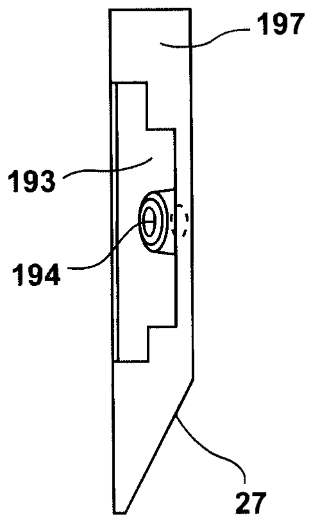
FIG. 18 is a side view of the second end cover of FIG. 17.
Figure 22:
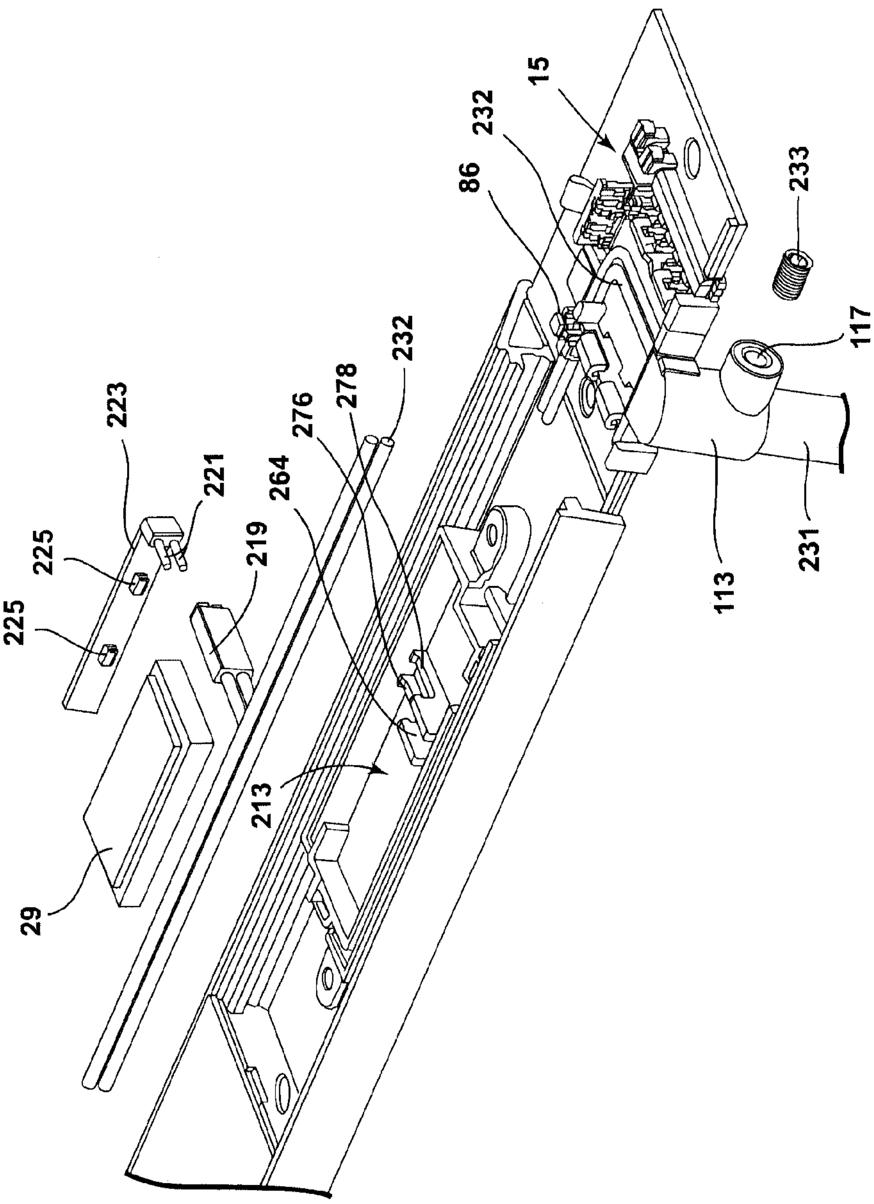
FIG. 22 is a fragmentary perspective view further illustrating electrical componentry of an illustrative embodiment.

An illustrative embodiment of an end wire way slide 21 is shown in more detail in FIG. 14 and also may be a single piece component, for example, molded of ZAMAK 3. The slide 21 includes a flat floor 101 having respective parallel side edges 103, 105, a vertical back wall 114, and respective vertical walls 107, 109, which are inset from the side edges 103, 105 and rise above the floor 101. The respective interiors of the walls 107, 109 oppositely disposed inwardly extending sets of mounting tabs 111 formed thereon, while the exterior surfaces of the walls 107, 109 each have a number of vertical support ribs 110 formed thereon, which define adjustments slots, e.g. 112. A wire guide 113 is formed at one end of the wire way slide 21 and has an internal opening 115 formed in the back wall 114 for receiving an electrical power conduit and guiding wires within the conduit out through a threaded hole 117, which receives a set screw, e.g. 223 (FIG. 22).

The end wire way covers 25, 27 are respectively illustrated in FIGS. 15-16 and 17-18, may be formed, for example, of ZAMAK 3, and are designed to flushly mate with the end wire way base 15 and to be fastened in place via set screws which thread into respective openings 192, 194. Each of the wire way covers 25, 27 has a stepped opening 191, 193 formed in a vertical front face 195, 197 thereof.

Figure 19:
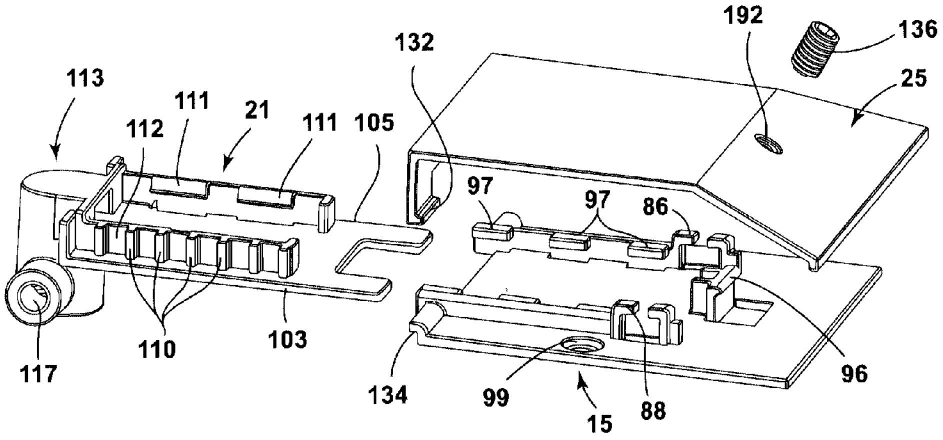
FIG. 19 is a perspective view of an illustrative embodiment of an end wire way assembly in a disassembled state.
Figure 20:
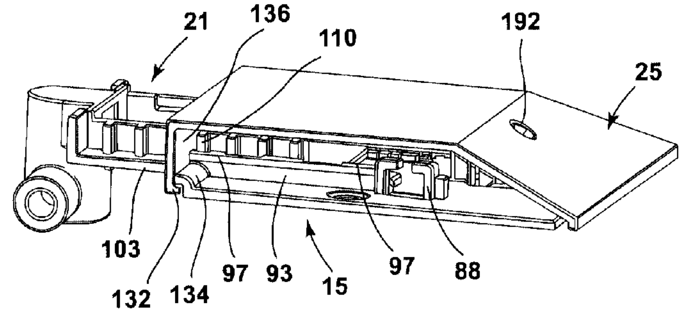
FIG. 20 is a perspective view of an illustrative embodiment of the end wire way assembly in an assembled state.

The manner of assembly of the wire way base 15, and wire way slide 21, and wire way cover 25 is illustrated in FIGS. 19 and 20. As may be seen, the wire way slide 21 is first inserted into the wire way base 15, such that the edges 103, 105 of the slide 21 slide into the grooves 106, 108 formed by the inwardly disposed tabs 97 of the wire way base 15. The slide 21 is slid or inserted into the base 15 to the extent desired and then the cover 25 is installed as shown in FIG. 20. When installed, the edge or tab 136 of the cover 25 fits into one of the slots 112 formed by the ribs 110 so as to retain the slide 21 at the selected depth or distance of insertion into the base 15. At the same time the lips 132 and 134 of cover 25 and wire way base 15 engage or interlock so as to assist in holding the cover 25 in place. In one embodiment, the adjustable insertion feature of the slide 21 enables attaching the seat marker assembly to a flat surface of a stair step by allowing the connector, e.g. 113 to extend beyond a rounded step edge for wiring purposes. In other words, the extension of slide component 25 enables proper alignment and connection to a vertically oriented conduit on the face of the step edge in the event that the vertical face and the top (horizontal) surface of the step where the raceway is mounted is non-orthogonal; e.g. "rounded."

The hole 192 in the cover 25 and the rear vertical wall 96 of the base 15 are so shaped, positioned and dimensioned that the set screw 136 threads through the hole 192 and engages or bites into the wall 96 to thereby fasten the cover 25 firmly in place. Thus, in the illustrative embodiment, only a single set screw 136, as opposed to a number of screws or fastening devices, is employed to hold the cover 25 in place and fix the position of the slide 21 and the rest of the assembly.

Figure 21:
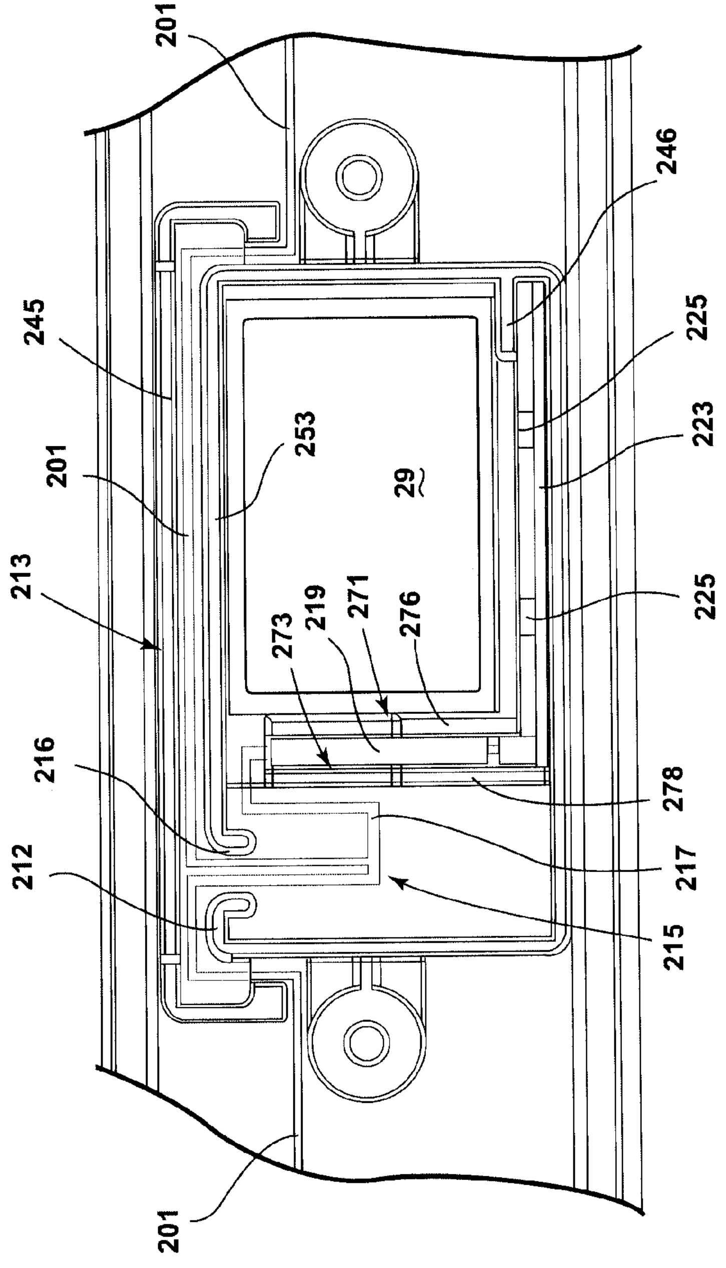
FIG. 21 is a top view of a second illustrative central base component embodiment with electrical componentry installed.

FIGS. 21 and 22 illustrate further details of manner of illuminating the marker 29 and conducting power through the system. FIG. 21 illustrates a central base embodiment 213 of slightly different configuration than that of FIGS. 6-8. As shown, a power conduit 201 enters the central base 213 and is guided by wall surfaces 212, 216 and posts 214, 216 to a point 215 where a conduit feed 217 branches off to supply power to a two pin socket 219 into which plug two conductor pins 221 (FIG. 22) of a printed circuit board (PCB) 223. The PCB 223 mounts one or more LEDs 225, which direct light sidewardly into the marker 29 to illuminate it. In one embodiment, the LEDs 225 may be, for example, surface mount diodes (SMD). It may be noted that, in this embodiment, the reduced height surfaces 276, 278 (analogous to surfaces 76, 78 of FIG. 6) permit manual gripping of the socket 219 for purposes of removing it or inserting it into the groove formed between the two vertically projecting surfaces 271, 273. Additionally, parallel walls 253, 245 serve to guide the wire harness through the central base 213, and a wall tab 246 assists in holding the circuit board 223 and marker 29 in place.

FIG. 22 further illustrates a conduit 231 fixed in place by a set screw 233 and which carries a wire harness 232, which enters through the wire guide 113. The wire harness 232 is then conducted across the floor of the wire way base 15, through the wire guide or clamp 86, and then to the central base 213.

Figure 23:
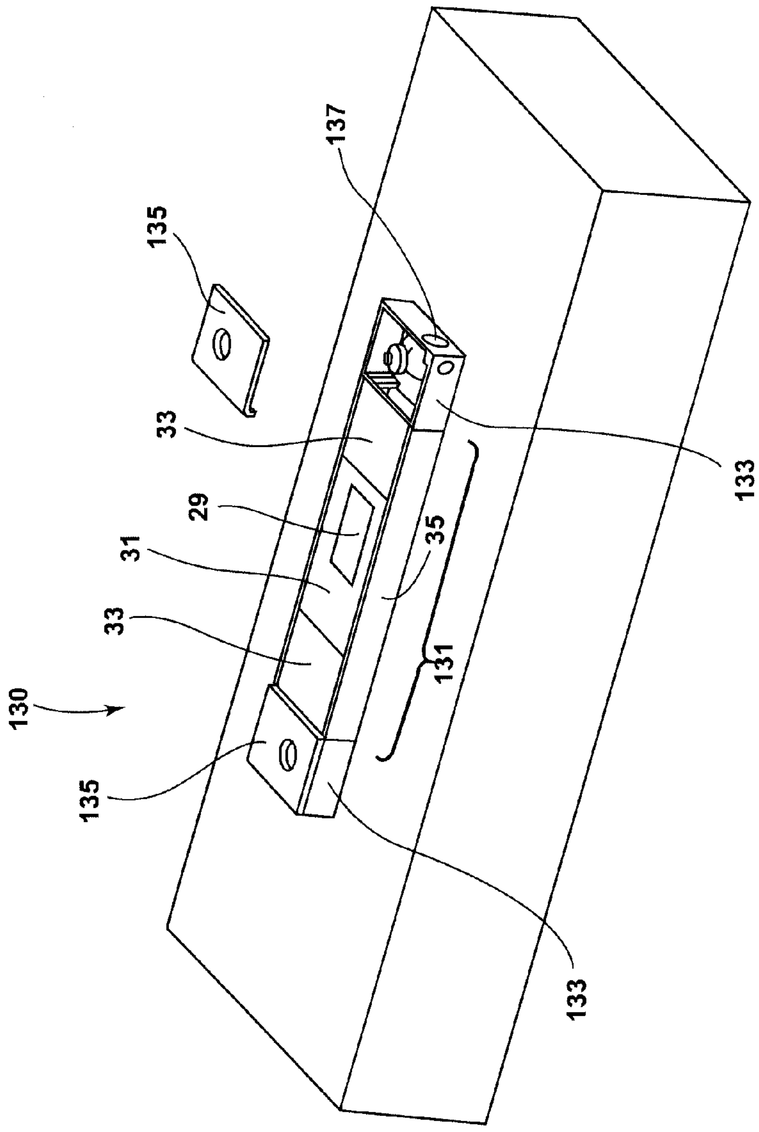
FIG. 23 is a perspective view of an alternate seat marker embodiment.
Figure 24:
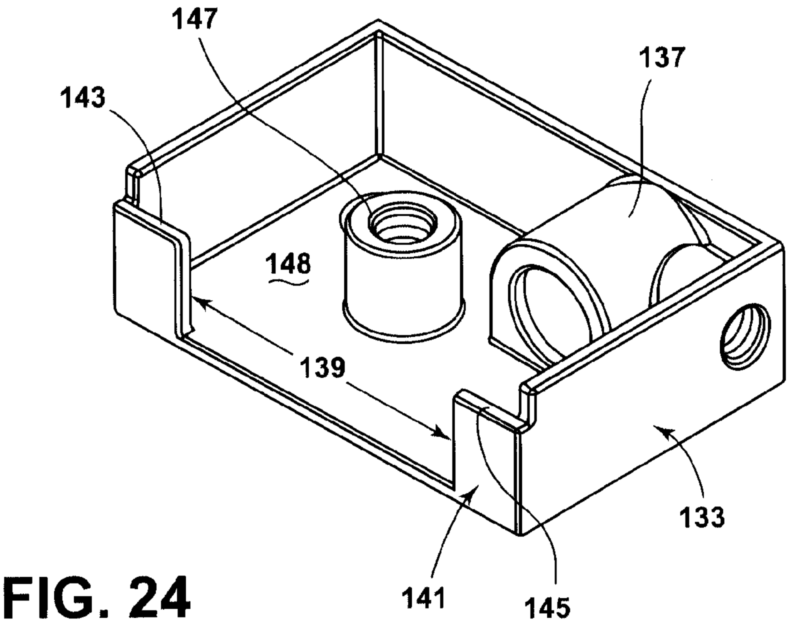
FIG. 24 is a perspective view of an end base component of the alternate embodiment of FIG. 23.
Figure 25:
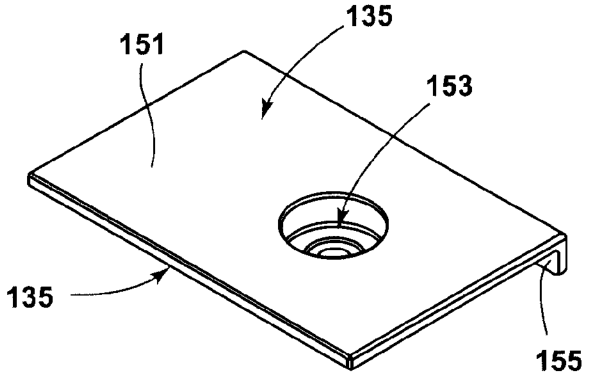
FIG. 25 is a perspective view of the cover component of the alternate embodiment of FIG. 23.

An alternate embodiment 130 is illustrated in FIGS. 23-25. This embodiment employs the same central structure 131 as the embodiment of FIG. 1, including a central base 13 (not visible), raceway 35, covers 31, 33 and marker 29. In the alternate embodiment 130, however, the end base 15 is replaced with a different end wire way base 133 and end wire way cover 135, shown in more detail respectively in FIGS. 16 and 17. As seen in FIG. 24, the wire way base 133 has a power conduit inlet or opening 137 formed in one end thereof and a generally rectangular opening 139 formed in the opposite end 141, which end 141 abuts one end of the raceway 35 when the unit is assembled. Recessed ledges 143, 145 are also formed at either side of the rectangular opening 139. A central boss 147 formed on the floor 148 of the base 133 facilitates attaching the cover 135 to the base 133. Two through holes may be formed on the floor 148 of the base 133 to facilitate attaching the base 133 to a mounting surface or floor.

As shown in FIG. 25, in the illustrative alternate embodiment, the wire way cover 135 has a generally flat top surface 151 and a countersunk hole 153, which is positioned to lie concentrically over the boss 147 of the base 133, so as to enable a fastening device to pass through both the hole 153 and the boss 147. A lip 155 is formed on one end of the cover 135 and is dimensioned to abut the respective ledges 143, 145 and otherwise flushly mate with the base component 133. This alternative embodiment provides a simplified design, which reduces material and manufacturing cost.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A seat marker assembly comprising:

a central base component comprising a plurality of surfaces disposed to receive and mount a seat marker component, an LED carrying circuit board, a connector plug and electrical conductors passing therethrough, said central base component having one or more mounting tabs located on respective first and second side surfaces thereof;

a raceway for mounting on a surface having first and second ribs extending from respective inner vertical sidewalls thereof and positioned to receive the one or more mounting tabs so as to receive and retain said central base component; said raceway providing first and second open areas on either side of the central base component;

first and second wire way covers shaped and dimensioned to respectively cover said first and second open areas and to engage said first and second ribs so as to be held in position on either side of said central base component;

a seat marker component dimensioned to fit within a space in said central base component and to be retained by said plurality of surfaces;

an end wire way base component for mounting on said surface at an end of said raceway, said end wire way base component comprising first and second parallel vertical side walls and an end vertical wall;

an end wire way slide component comprising a flat floor having parallel side edges and first and second parallel vertical walls, each lying parallel to a respective side edge, a back wall lying perpendicular to said first and second parallel vertical walls, and a wire guide formed at an end thereof, the end wire way slide component having an interior opening formed in said back wall;

wherein the end wire way base component and end wire way slide component are so configured that said end wire way slide component slidably mounts into said end wire way base component; and a wire way slide cover configured to engage respective slots on said first and second parallel vertical walls to position said end wire way slide component at a selected depth of insertion into said end wire way base component.

2. The seat marker assembly of claim 1 further comprising a circuit board carrying one or more LEDs and wherein said plurality of surfaces further serve to position said circuit board adjacent said seat marker component.

3. The seat marker assembly of claim 2 further comprising an electrical plug component configured to supply electrical power to said circuit board and where said plurality of surfaces further position and retain said electrical plug component.

4. The seat marker assembly of claim 3 further comprising a plurality of electrical conductors for supplying power to said plurality of electrical plug and wherein said surfaces further serve to guide said conductors through said central base component.

5. A seat marker assembly comprising:

a central base portion comprising:

a first continuous vertical wall segment including a first sidewall and two end walls;

a second continuous vertical wall segment including an outer sidewall and an inner sidewall, the outer and inner sidewalls being joined by an end wall and being parallel to one another and parallel to said first sidewall, said inner sidewall lying within and adjacent to said first sidewall, said outer sidewall being perpendicularly disposed at an opposite end to a first end wall which forms into a second end wall;

first and second projecting surfaces; and respective mounting tabs at opposite ends of said central base portion; at least one side tab formed on an outside surface of said first sidewall and on an outside surface of said outer sidewall;

a raceway having first and second ribs extending from respective inner vertical sidewalls thereof and positioned to receive said at least one side tab so as to receive and retain said central base portion; said raceway being of a length so as to provide first and second open areas on either side of the central base portion;

first and second wire way covers shaped and dimensioned to respectively cover said first and second open areas and to engage said first and second ribs so as to be held in position on either side of said base portion;

a seat marker component dimensioned to fit snugly within a space in said central base;

a wire way base component for mounting adjacent an end of said raceway and having first and second side walls and an end vertical wall;

a wire way slide comprising a flat floor having parallel side edges and first and second parallel vertical walls, each lying parallel to a respective side edge and a back wall lying perpendicular to the first and second parallel vertical walls and a wire guide formed at one end thereof and having an interior opening formed in said back wall;

wherein said wire way slide slidably mounts into said wire way base component; and a wire way cover for covering the assembled wire way base component and wire way slide.

* * * * *